(12) United States Patent
Yamashita

(10) Patent No.: US 7,934,418 B2
(45) Date of Patent: May 3, 2011

(54) ABNORMALITY DIAGNOSIS DEVICE OF INTAKE AIR QUANTITY SENSOR

(75) Inventor: Hiroshi Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 283 days.

(21) Appl. No.: 12/401,100

(22) Filed: Mar. 10, 2009

(65) Prior Publication Data
US 2009/0260428 A1    Oct. 22, 2009

(30) Foreign Application Priority Data

Apr. 21, 2008  (JP) .................................. 2008-109951

(51) Int. Cl.
*G01M 15/04* (2006.01)
(52) U.S. Cl. .................................. 73/114.32; 73/114.77
(58) Field of Classification Search ............... 73/114.31, 73/114.32, 114.33, 114.34, 114.77
See application file for complete search history.

(56) References Cited

U.S. PATENT DOCUMENTS

| 5,741,964 | A | 4/1998 | Mizutani |
| 7,273,046 | B2 * | 9/2007 | Osumi ........................ 123/681 |
| 2009/0078033 | A1 * | 3/2009 | Iwai ........................... 73/114.34 |
| 2009/0100921 | A1 * | 4/2009 | Mc Lain et al. ............ 73/114.31 |
| 2009/0235725 | A1 * | 9/2009 | Mc Lain et al. ............ 73/114.34 |

* cited by examiner

*Primary Examiner* — Eric S McCall
(74) *Attorney, Agent, or Firm* — Nixon & Vanderhye PC (57) ABSTRACT

While there occurs a steady operation state where an engine operation state (such as intake air quantity) is maintained substantially constant, a high-response intake air quantity sensor (referred to as the sensor, hereafter) is temporarily powered off and is powered on again when a predetermined time elapses after the power-off. An output rising characteristic of the sensor at the time when the sensor is powered on again is sensed and abnormality diagnosis of the sensor is performed based on the sensing value of the output rising characteristic During a power-off period, the engine operation state is controlled using a sensing value (a stored value) of the sensor immediately preceding the power-off. When an abnormality of the sensor is detected, use of the sensor is prohibited and the intake air quantity is estimated based on intake pipe pressure and the like.

7 Claims, 7 Drawing Sheets

ABNORMALITY DIAGNOSIS DEVICE OF INTAKE AIR QUANTITY SENSOR

CROSS REFERENCE TO RELATED APPLICATION

This application is based on and incorporates herein by reference Japanese Patent Application No. 2008-109951 filed on Apr. 21, 2008.

BACKGROUND OF THE INVENTION

1. Field of the Invention

The present invention relates to an abnormality diagnosis device that performs abnormality diagnosis of an intake air quantity sensor (an airflow meter) that senses intake air quantity of an internal combustion engine.

2. Description of Related Art

As a conventional abnormality diagnosis device of an intake air quantity sensor (an airflow meter), there is an abnormality diagnosis device that determines existence/nonexistence of an abnormality in an intake air quantity sensor based on whether a difference between a sensing value of the intake air quantity sensor (i.e., actual intake air quantity) and target intake air quantity is equal to or greater than a predetermined determination threshold value when a throttle opening degree is equal to or smaller than a predetermined throttle opening degree (i.e., in a small air quantity range where the actual intake air quantity is not fluctuated by fluctuation of engine rotation speed) during an operation of an internal combustion engine, for example, as described in Patent document 1 (Japanese Patent No. 3052813).

The abnormality diagnosis device of the intake air quantity sensor described in Patent document 1 performs the abnormality diagnosis of the intake air quantity sensor based on whether the difference (i.e., the error) between the sensing value of the intake air quantity sensor (i.e., the actual intake air quantity) and the target intake air quantity exceeds the determination threshold value (i.e., a permissible error) while there occurs a steady operation state where the actual intake air quantity is small, Therefore, when a response characteristic of the intake air quantity sensor is deteriorated by degradation of a sensor element, a circuit failure or the like, the deterioration of the response characteristic cannot be detected as the abnormality. It is because time until the sensing value of the intake air quantity sensor converges to the target intake air quantity merely extends and the difference between the sensing value of the intake air quantity sensor and the target intake air quantity falls within the determination threshold value when the time elapses in the steady operation state, in which the abnormality diagnosis of Patent document 1 is performed, even if the response characteristic of the intake air quantity sensor deteriorates.

If the response characteristic of the intake air quantity sensor deteriorates, time since the engine is started until accurate sensing of the intake air quantity becomes possible lengthens largely or sensing accuracy of the intake air quantity during a transient time in which the intake air quantity fluctuates worsens. In such the case, control accuracy of the air-fuel ratio control after the engine start or the air-fuel ratio control during the transient time deteriorates, and problems such as emission deterioration will arise.

SUMMARY OF THE INVENTION

It is an object of the present invention to provide an abnormality diagnosis device of an intake air quantity sensor capable of detecting also an abnormality of response characteristic deterioration of the intake air quantity sensor.

According to an aspect of the present invention, an abnormality diagnosis device of an intake air quantity sensor for sensing an intake air quantity of an internal combustion engine has an abnormality diagnosing section, a power supply switching section, and a steady operation determining section. The abnormality diagnosing section performs abnormality diagnosis of the intake air quantity sensor The power supply switching section temporarily powers off the intake air quantity sensor and then powers on the intake air quantity sensor again during an operation of the internal combustion engine. The steady operation determining section determines whether an operation state of the internal combustion engine is a steady operation state. The abnormality diagnosing section temporarily powers off the intake air quantity sensor and then powers on the intake air quantity sensor again with the power supply switching section in a period in which the steady operation determining section determines that the operation state of the internal combustion engine is the steady operation state. The abnormality diagnosing section senses an output rising characteristic of the intake air quantity sensor at the time when the intake air quantity sensor is powered on again and performs the abnormality diagnosis of the intake air quantity sensor based on a sensing value of the output rising characteristic. The output rising characteristic of the intake air quantity sensor is a response time, a time constant, an output at the time when a predetermined time elapses, or the like.

With the above construction, the intake air quantity sensor is temporarily powered off and then is powered on again while there occurs the steady operation state where the operation state of the internal combustion engine (such as the intake air quantity) is maintained substantially constant, The output rising characteristic of the intake air quantity sensor at the time when the intake air quantity sensor is powered on again (such as the response time, the time constant and the output at the time when a predetermined time elapses) is sensed. Therefore, the output rising characteristic of the intake air quantity sensor can be sensed with high accuracy during the operation of the internal combustion engine, Also, the abnormality of the response characteristic deterioration of the intake air quantity sensor can be detected with high accuracy based on the sensing value of the output rising characteristic. In this case, if a constant abnormality that the output of the intake air quantity sensor constantly deviates from a normal range occurs, the output rising characteristic of the intake air quantity sensor at the time when the intake air quantity sensor is powered on again also deviates from a normal range because of the constant abnormality. Therefore, the constant abnormality of the intake air quantity sensor can be also detected with high accuracy based on the output rising characteristic of the intake air quantity sensor at the time when the intake air quantity sensor is powered on again.

According to another aspect of the present invention, the steady operation determining section determines whether the operation state of the internal combustion engine is the steady operation state based on one or a combination of two or more of rotation speed of the internal combustion engine, a throttle opening degree, valve timing, ignition timing, fuel injection timing, fuel injection quantity, an air-fuel ratio, an accelerator operation amount and a change gear ratio of a transmission. The operation state where either one of the above parameters is fluctuating is the transient operation state and can be determined to be the state where the intake air quantity is fluctuating or is apt to fluctuate.

The output rising characteristic of the intake air quantity sensor changes also with a temperature state of a sensor element of the intake air quantity sensor at the time immediately before the intake air quantity sensor is powered on again. Therefore, if the intake air quantity sensor is powered on again and the output rising characteristic of the intake air quantity sensor is sensed in a state where the sensor element of the intake air quantity sensor is not cooled down sufficiently because the power-off period is too short, the sensing value of the output rising characteristic of the intake air quantity sensor changes due to the influence of the temperature state of the sensor element of the intake air quantity sensor at the time immediately before the intake air quantity sensor is powered on again, and there is a possibility that the normality/abnormality is erroneously diagnosed.

Therefore, according to another aspect of the present invention, time since the power supply switching section temporarily powers off the intake air quantity sensor until the power supply switching section powers on the intake air quantity sensor again is set in accordance with time since the intake air quantity sensor is powered off until a state of a sensor element of the intake air quantity sensor substantially returns to an initial state (i.e., a state before a start). With such the construction, control can be performed such that the power supply is resumed and the output rising characteristic of the intake air quantity sensor is sensed after the state of the sensor element of the intake air quantity sensor substantially returns to the initial state (i.e., the state before the start). Accordingly, the output rising characteristic of the intake air quantity sensor can be sensed with high accuracy.

According to another aspect of the present invention, the abnormality diagnosis device further has an operation controlling section for controlling an operation state of the internal combustion engine (such as the fuel injection quantity and the throttle opening degree) in a period, in which the power supply switching section powers off the intake air quantity sensor (referred to as a power-off period, hereinafter), by using a sensing value of the intake air quantity sensor immediately preceding the power-off.

That is, in the abnormality diagnosis of the intake air quantity sensor according to the above aspect of the present invention, the intake air quantity sensor is powered off in the steady operation state where the intake air quantity is substantially constant. Therefore, it can be estimated that the intake air quantity during the power-off period substantially coincides with the intake air quantity immediately preceding the power-off. Therefore, the engine operation state (such as the fuel injection quantity and the throttle opening degree) can be controlled using the sensing value of the intake air quantity sensor immediately preceding the power-off as the intake air quantity during the power-off period. Thus, the control accuracy of the operation state of the internal combustion engine during the power-off period can be secured. The sensing value of the intake air quantity sensor immediately preceding the power-off may be stored in a memory.

According to another aspect of the present invention, the abnormality diagnosis device further has an abnormal time intake air quantity estimating section for prohibiting the sensing of the intake air quantity with the intake air quantity sensor and for estimating the intake air quantity based on at least one of intake pipe pressure, the throttle opening degree and rotation speed of the internal combustion engine when the abnormality diagnosing section detects the abnormality of the intake air quantity sensor.

With such the construction, when the abnormality of the intake air quantity sensor is detected, use of the intake air quantity sensor is stopped immediately, and the intake air quantity can be estimated using the outputs of the other sensors (an intake pipe pressure sensor, a throttle position sensor, a crank angle sensor and the like) provided for the operation control of the internal combustion engine. Thus, even when the intake air quantity sensor is abnormal, the operation control of the internal combustion engine according to the intake air quantity can be continued.

According to another aspect of the present invention, the abnormality diagnosis device further has an abnormal time throttle opening degree limiting section for limiting the throttle opening degree to or under a predetermined opening degree when the abnormality diagnosing section detects the abnormality of the intake air quantity sensor. With such the construction, when the intake air quantity sensor is abnormal, the engine power can be limited within the range where the driver can perform the operation relatively safely. Thus, the safety is improved.

According to yet another aspect of the present invention, the abnormality diagnosis device further has an air-fuel ratio feedback control section, a learning correcting section, a learning value limiting section and an abnormal time guard value enlarging section The air-fuel ratio feedback control section performs feedback control of an air-fuel ratio to a target air-fuel ratio during an operation of the internal combustion engine. The learning correcting section learns an air-fuel ratio correction value and corrects the air-fuel ratio with the learning value during the feedback control of the air-fuel ratio. The learning value limiting section limits the learning value of the air-fuel ratio correction value with upper and lower limit guard values. The abnormal time guard value enlarging section enlarges an interval between the upper and lower limit guard values when the abnormality diagnosing section detects the abnormality of the intake air quantity sensor.

When the intake air quantity sensor is abnormal, air-fuel ratio control accuracy is deteriorated by the deterioration of the sensing accuracy of the intake air quantity, so the deviation of the actual air-fuel ratio from the target air-fuel ratio enlarges. Therefore, by enlarging the interval between the upper and lower limit guard values of the learning value of the air-fuel ratio correction value when the intake air quantity sensor is abnormal as in the above aspect of the present invention, the learning value of the air-fuel ratio correction value at the time when the intake air quantity sensor is abnormal can be increased as compared to the usual case (i.e., the case where the intake air quantity sensor is normal), and the air-fuel ratio (or the fuel injection quantity) can be corrected with the large learning value. Thus, the deviation of the actual air-fuel ratio from the target air-fuel ratio can be reduced by effectively using the learning correction function of the feedback control of the air-fuel ratio when the intake air quantity sensor is abnormal.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application In the drawings:

DETAILED DESCRIPTION OF EXAMPLE EMBODIMENTS

Hereafter, three embodiments of the present invention will be described with reference to the drawings.

First Embodiment

First, a first embodiment of the present invention will be described with reference to FIGS. 1 to 5. First, a general configuration of an entire engine control system according to the first embodiment will be explained with reference to FIG. 1. An air cleaner 13 is provided in the most upstream portion of an intake pipe 12 of an engine 11 (an internal combustion engine). An intake air quantity sensor 14 for sensing an intake air quantity is provided downstream of the air cleaner 13. The intake air quantity sensor 14 is a high-response type intake air quantity sensor having a sensor element 14a (refer to FIG. 2), an output of which changes with high response in accordance with change in the intake air quantity.

Figure 1:
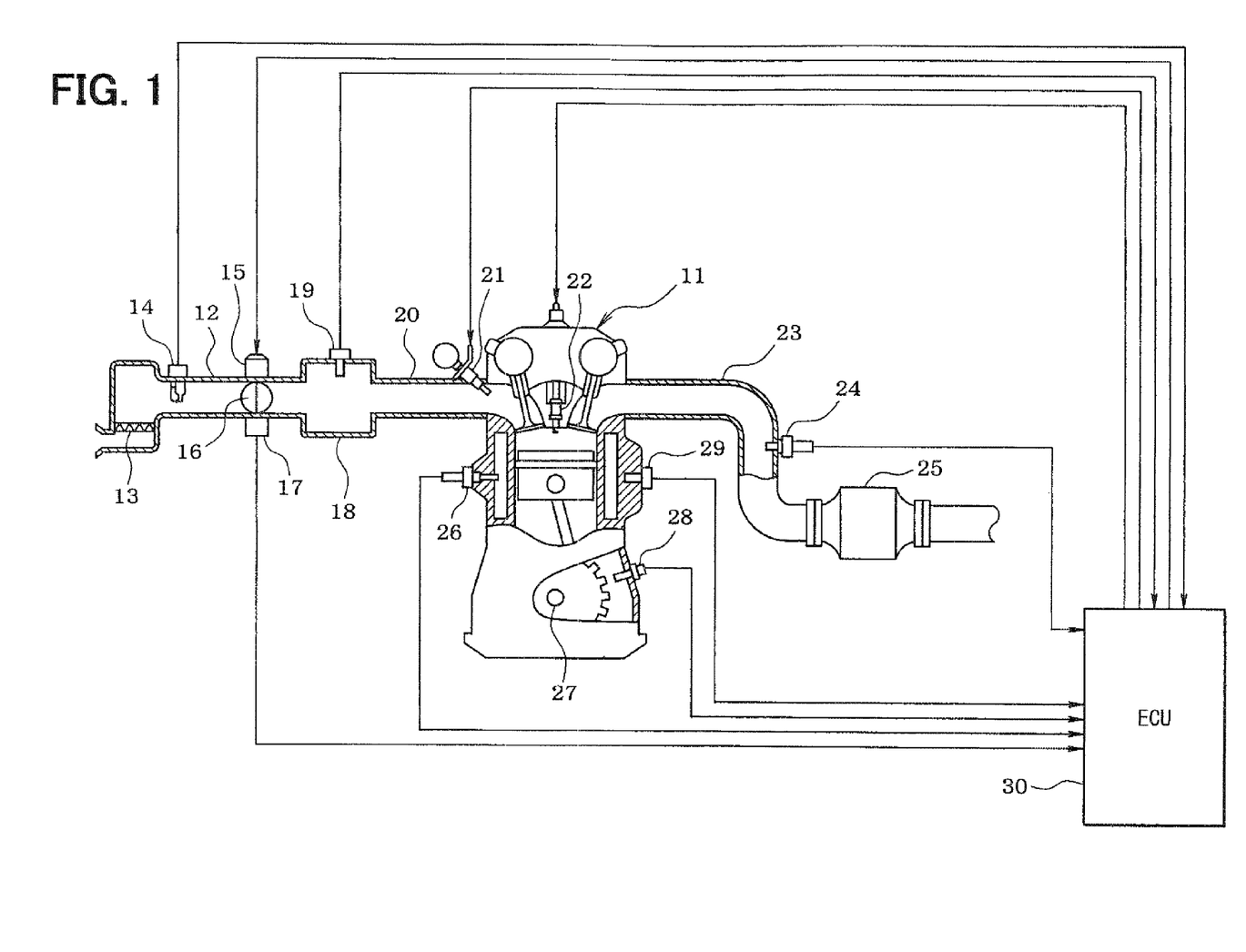
FIG. 1 is a schematic configuration diagram showing an engine control system according to a first embodiment of the present invention.

A throttle valve 16, an opening degree of which is regulated by a motor 15, and a throttle position sensor 17 for sensing an opening degree of the throttle valve 16 (i.e., a throttle opening degree) are provided downstream of the intake air quantity sensor 14.

A surge tank 18 is provided downstream of the throttle valve 16, and an intake pipe pressure sensor 19 for sensing intake pipe pressure is provided to the surge tank 8. Alternatively, the intake pipe pressure sensor 19 may be omitted. An intake manifold 20 for introducing the air into each cylinder of the engine 11 is provided to the surge tank 18. An injector 21 for injecting fuel is attached near an inlet port of the intake manifold 20 of each cylinder. Spark plugs 22 are attached to a cylinder head of the engine 11 for the respective cylinders for igniting a fuel-air mixture in the cylinders with spark discharges from the respective spark plugs 22.

An exhaust gas sensor 24 (an air-fuel ratio sensor, an oxygen sensor, or the like) for sensing an air-fuel ratio or a rich/lean state of exhaust gas or the like is provided to an exhaust pipe 23 of the engine 11. A catalyst 25 such as a three-way catalyst for purifying the exhaust gas is provided downstream of the exhaust gas sensor 24.

A coolant temperature sensor 26 for sensing coolant temperature and a knock sensor 29 for sensing knocking vibration are attached to a cylinder block of the engine 11. A crank angle sensor 28, which outputs a pulse signal every time a crankshaft 27 rotates by a predetermined crank angle, is provided adjacent to an outer periphery of the crankshaft 27. A crank angle and engine rotation speed are sensed based on an output signal of the crank angle sensor 28.

Outputs of the above various sensors are inputted to an engine control circuit 30 (referred to as an ECU, hereinafter). The ECU 30 is constituted mainly by a microcomputer. The ECU 30 executes air-fuel ratio control routines stored in an incorporated ROM (a storage medium). Thus, the ECU 30 performs feedback control for conforming the air-fuel ratio (or fuel injection quantity) to a target air-fuel ratio based on the output of the exhaust gas sensor 24. In addition, the ECU 30 learns an air-fuel ratio correction value and corrects the air-fuel ratio with the learning value during the air-fuel ratio feedback control. Furthermore, the ECU 30 limits the learning value of the air-fuel ratio correction value with upper and lower limit guard values in order to prevent erroneous learning of the air-fuel ratio correction value (i.e., the ECU 30 performs guard processing).

In the above control, the ECU 30 calculates fuel injection quantity based on the intake air quantity sensed with the intake air quantity sensor 14 and the like. If a response characteristic of the intake air quantity sensor 14 deteriorates, time since the engine is started until accurate sensing of the intake air quantity becomes possible lengthens largely or sensing accuracy of the intake air quantity during a transient period in which the intake air quantity fluctuates worsens. In such the case, control accuracy of the air-fuel ratio control after the engine start or the air-fuel ratio control during the transient period deteriorates, thereby causing problems such as emission deterioration. When the intake air quantity sensor 14 breaks down and the output of the intake air quantity sensor 14 becomes constantly abnormal, the sensing value of the intake air quantity turns into an abnormal value also in a steady operation state.

Figure 2:
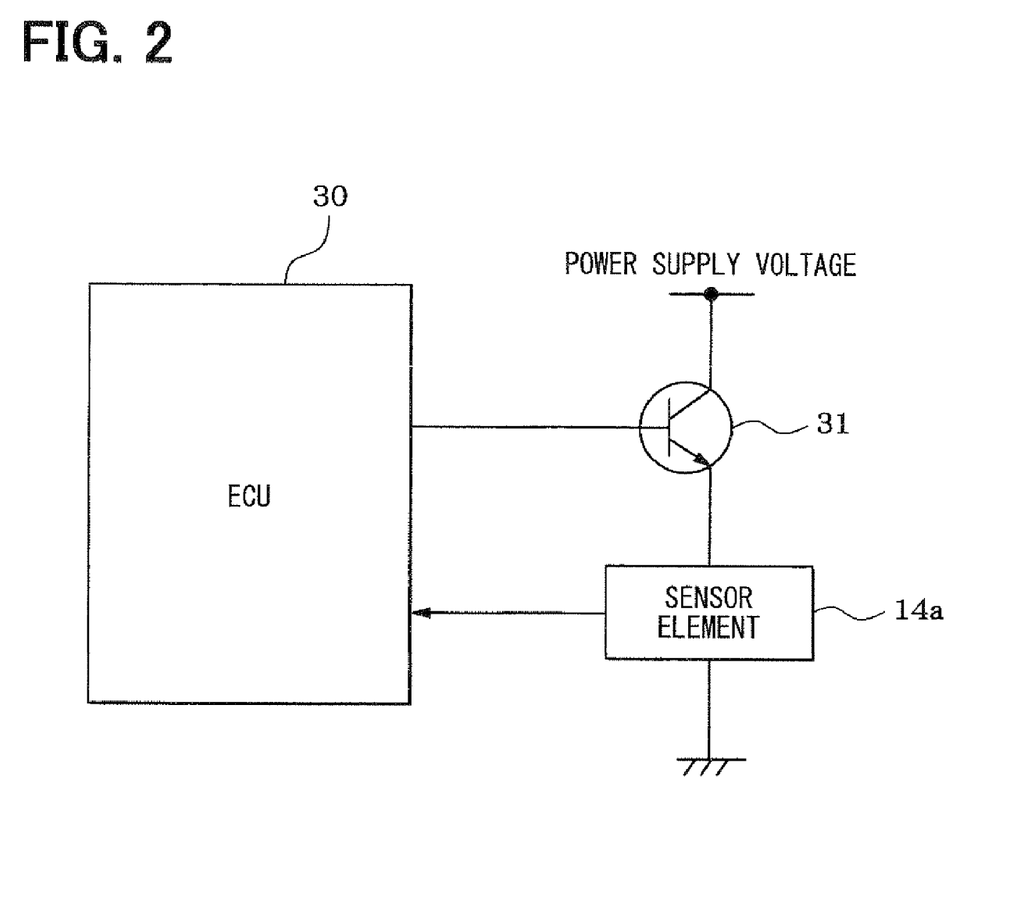
FIG. 2 is an electric circuit diagram showing a power supply circuit of a sensor element of an intake air quantity sensor according to the first embodiment.
Figure 3:
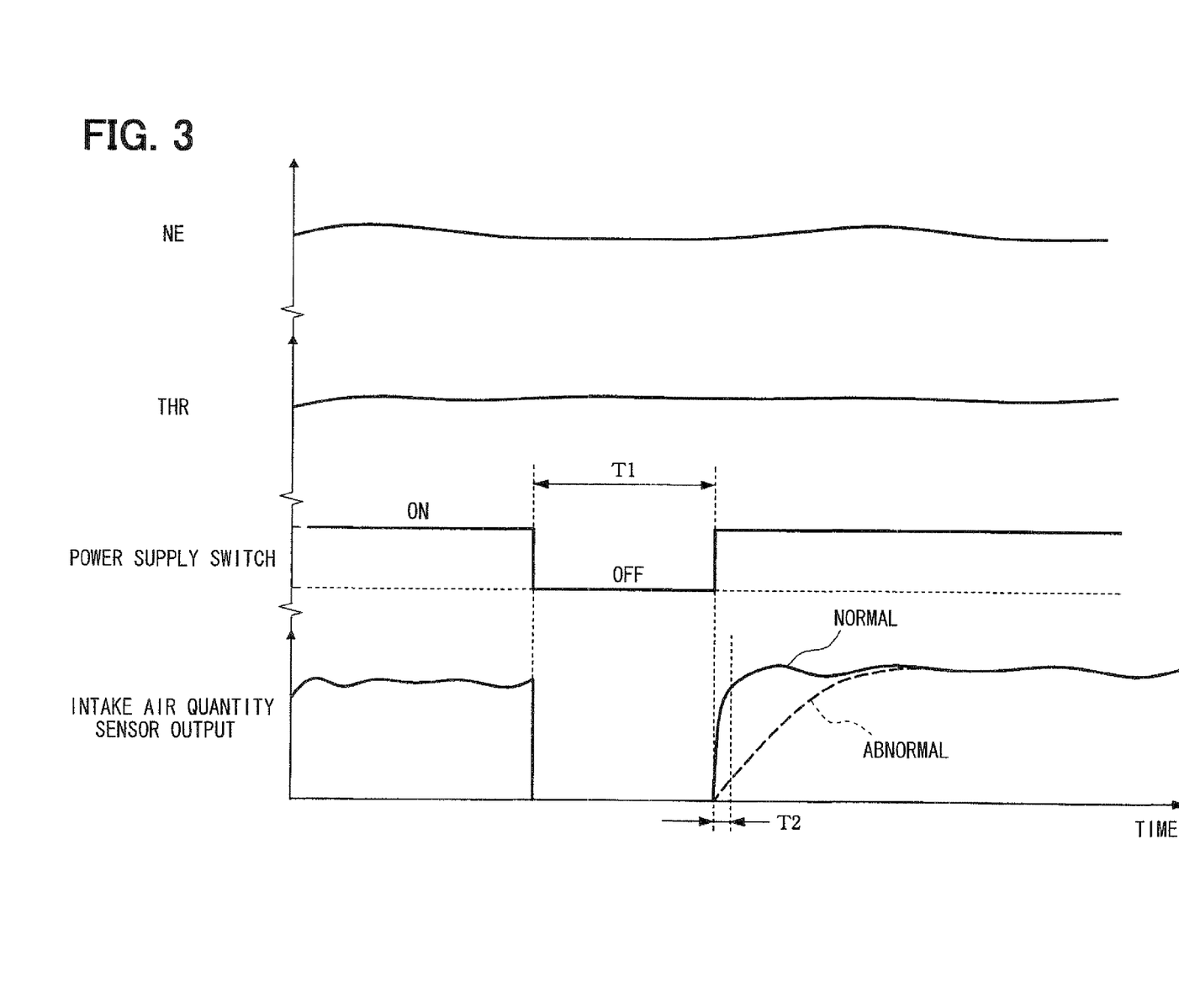
FIG. 3 is a time chart showing an execution example of abnormality diagnosis processing of the intake air quantity sensor according to the first embodiment.

Therefore, in the present embodiment, as shown in FIG. 2, a power supply switch device 31 is provided in series with a power supply circuit of the sensor element 14a. The power supply switch device 31 temporarily shuts off the power supply of the sensor element 14a of the intake air quantity sensor 14 and then resumes the power supply (i.e., recloses the power supply circuit) during an engine operation. The power supply switch device 31 may be arbitrarily selected from a semiconductor switching element such as a transistor a relay and the like. The intake air quantity sensor 14 is temporarily powered off by temporarily switching off the power supply switch device 31 while there occurs a steady operation state where an engine operation state (such as the intake air quantity) is maintained substantially constant as shown in FIG. 3. Then, the intake air quantity sensor 14 is powered on again by switching on the power supply switch device 31 when a predetermined time T1 elapses after the intake air quantity sensor 14 is powered off. An output rising characteristic of the intake air quantity sensor 14 at the time when the intake air quantity sensor 14 is powered on again is sensed, and abnormality diagnosis of the intake air quantity sensor 14 is performed based on the sensing value of the output rising characteristic.

As the output rising characteristic of the intake air quantity sensor 14, a response time or a time constant may be sensed. Alternatively, the output at the time when a predetermined time T2 elapses after the intake air quantity sensor 14 is powered on again may be sensed. As for the sensing method of the response time, a time since the intake air quantity sensor 14 is powered on again until the output of the intake air quantity sensor 14 exceeds a certain ratio (for example, 50%, 63.2%, 70%, 80%, 90%, 95% or the like) of a final convergence value (i.e., a stored value of the output immediately preceding the power-off) may be sensed as the response time. Generally, the response time until 63.2% of the final convergence value is exceeded is called the time constant. If the sensing value of the response time or the time constant is larger than a variation range at the time when the intake air quantity sensor 14 is normal, it can de determined that the intake air quantity sensor 14 is abnormal.

When the output at the time when the predetermined time T2 elapses after the intake air quantity sensor 14 is powered on again is sensed, the predetermined time T2 may be set at either one of 70% response time, 80% response time, 90% response time, 95% response time or the like in the case of the normal response characteristic of the intake air quantity sensor 14, for example. If the sensing value of the output at the time when the predetermined time T2 elapses is lower than the variation range at the time when the intake air quantity sensor 14 is normal, it can de determined that the intake air quantity sensor 14 is abnormal.

As for the determination method of the steady operation state, it may be determined whether the engine operation state is the steady operation state based on one or a combination of two or more of the engine rotation speed NE, the throttle opening degree THR, valve timing, ignition timing, fuel injection timing, the fuel injection quantity, the air-fuel ratio, an accelerator operation amount, and a change gear ratio of a transmission It can be determined that the operation state where either of the above parameters is fluctuating is a transient operation state and is a state where the intake air quantity is fluctuating or is apt to fluctuate.

The response time of the intake air quantity sensor 14 changes also with a temperature state of the sensor element 14a of the intake air quantity sensor 14 at the time immediately before the intake air quantity sensor 14 is powered on again. Therefore, if the intake air quantity sensor 14 is powered on again and the response time of the intake air quantity sensor 14 is sensed in a state where the sensor element 14a of the intake air quantity sensor 14 has not been sufficiently cooled down yet because the power-off time is too short, the sensing value of the response time of the intake air quantity sensor 14 changes due to the influence of the temperature state of the sensor element 14a of the intake air quantity sensor 14 at the time immediately before the intake air quantity sensor 14 is powered on again. In this case, there is a possibility that the normality/abnormality is diagnosed erroneously.

Therefore, in the present embodiment, the time T1 since the intake air quantity sensor 14 is temporarily powered off until the intake air quantity sensor 14 is powered on again with the power supply switch device 31 is set to a time substantially equal to or slightly longer than a time since the intake air quantity sensor 14 is powered off until the state of the sensor element 14a of the intake air quantity sensor 14 substantially returns to an initial state (i.e., a state before a start). With such the construction, control can be performed such that the intake air quantity sensor 14 is powered on again and the response time of the intake air quantity sensor 14 is sensed when or after the state of the sensor element 14a substantially returns to the initial state (i.e., the state before the start) after the intake air quantity sensor 14 is powered off. Thus, the response time of the intake air quantity sensor 14 can be sensed with high accuracy.

During the period in which the power supply of the intake air quantity sensor 14 is shut off with the power supply switch device 31 (hereinafter, referred to as a power-off period), for example, the engine operation state (such as the fuel injection quantity and the throttle opening degree THR) is controlled using the sensing value (i.e., the stored value) of the intake air quantity sensor 14 at the time immediately before the power-off. In the abnormality diagnosis of the intake air quantity sensor 14 of the present embodiment, the power supply of the intake air quantity sensor 14 is temporarily shut off during the steady operation state where the intake air quantity is substantially constant. Therefore, it can be estimated that the intake air quantity during the power-off period substantially coincides with the intake air quantity immediately preceding the power-off. Therefore, the engine operation state such as the fuel injection quantity can be controlled during the power-off period by using the sensing value of the intake air quantity sensor 14 immediately preceding the power-off as the intake air quantity during the power-off period. Thus, the control accuracy of the engine operation state during the power-off period can be secured. The sensing value of the intake air quantity sensor 14 immediately preceding the power-off may be stored in a memory of the ECU 30.

In the present embodiment, when the abnormality in the intake air quantity sensor 14 is detected, the sensing of the intake air quantity with the intake air quantity sensor 14 is prohibited, and failsafe processing of estimating the intake air quantity with a map or an expression based on at least one of the intake pipe pressure, the throttle opening degree THR and the engine rotation speed NE is performed. With such the construction, when the abnormality in the intake air quantity sensor 14 is detected, use of the intake air quantity sensor 14 is stopped immediately, and the intake air quantity can be estimated using the outputs of other sensors (such as the intake pipe pressure sensor 19, the throttle position sensor 17 and the crank angle sensor 28) provided for the engine operation control. Thus, even in the case of the abnormality in the intake air quantity sensor 14, the engine operation control such as the fuel injection control according to the intake air quantity can be continued.

Figure 4:
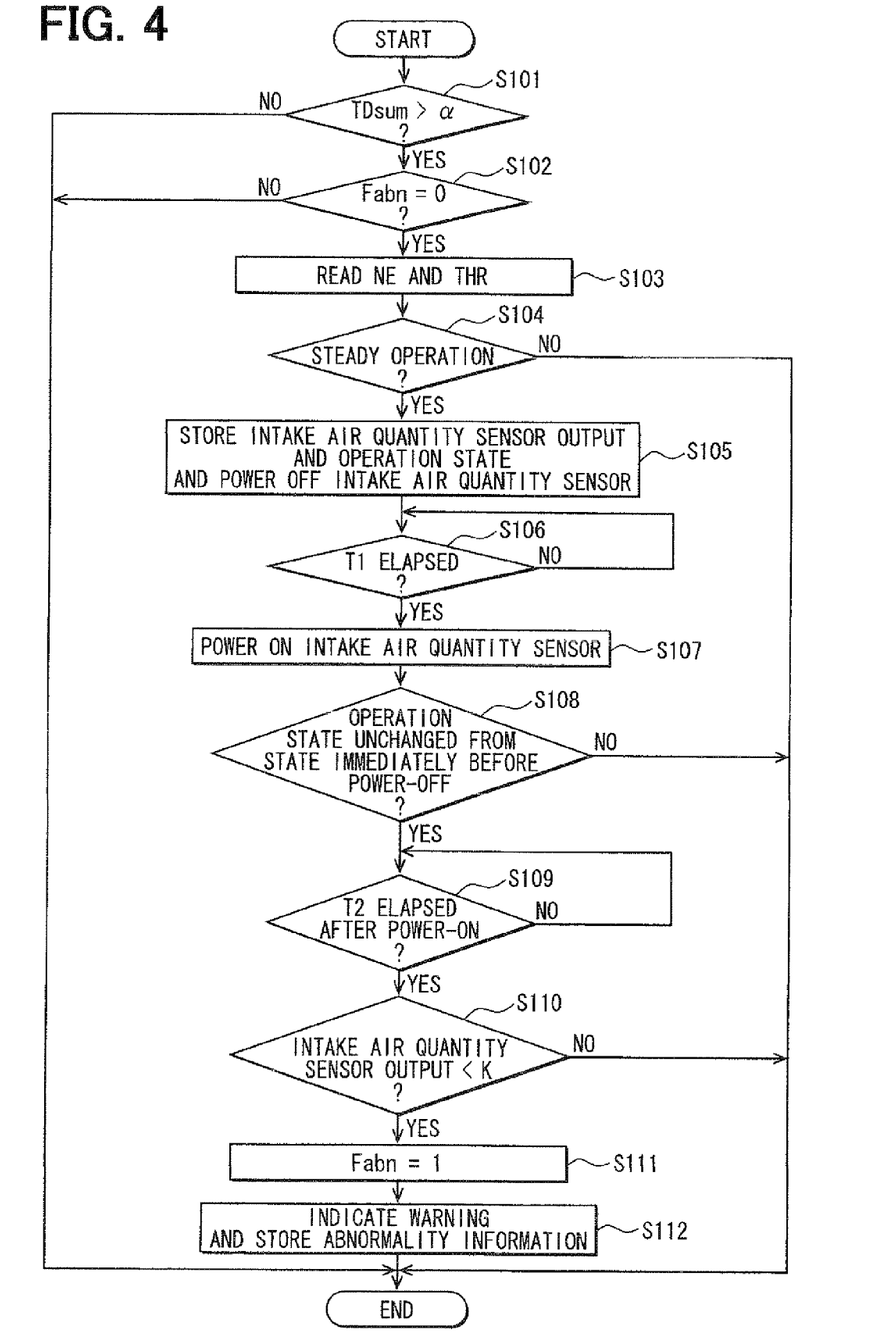
FIG. 4 is a flowchart showing a processing flow of an intake air quantity sensor abnormality diagnosis routine according to the first embodiment.
Figure 5:
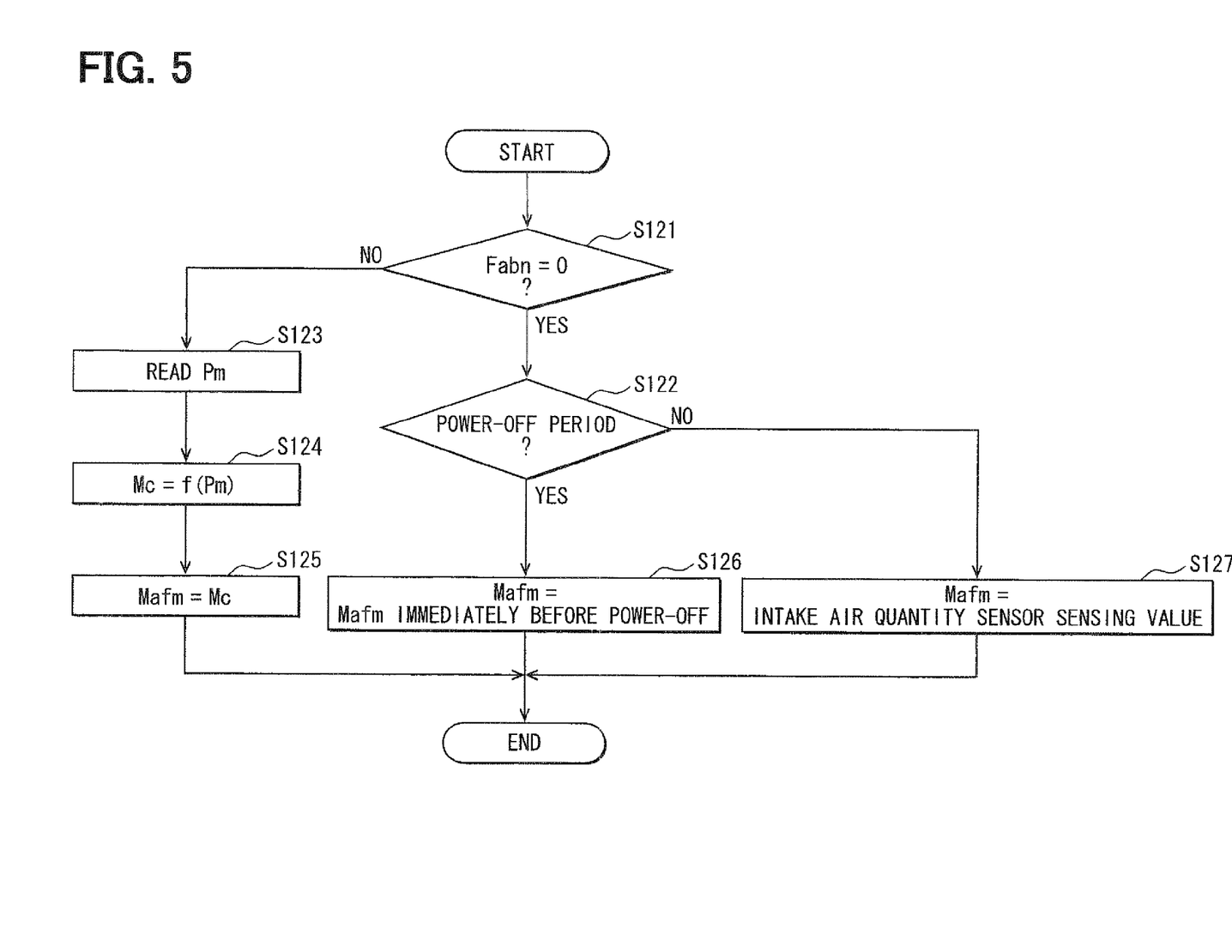
FIG. 5 is a flowchart showing a processing flow of an intake air quantity sensing routine according to the first embodiment.

The above-described abnormality diagnosis processing of the intake air quantity sensor 14 and the failsafe processing according to the present embodiment are performed by the ECU 30 according to routines of FIGS. 4 and 5. Hereafter, processing contents of each of the routines will be explained.

(Intake Air Quantity Sensor Abnormality Diagnosis Routine)

An intake air quantity sensor abnormality diagnosis routine shown in FIG. 4 is executed repeatedly in a predetermined cycle during the engine operation and functions as an abnormality diagnosing section. If the routine is started, first in S101 (S means "Step"), it is determined whether execution timing of the abnormality diagnosis is reached based on whether an integrated travel distance TDsum after the last abnormality diagnosis has exceeded a predetermined distance α. Instead of the integrated travel distance TDsum, it may be determined whether the execution timing of the abnormality diagnosis is reached based on whether an elapsed period (elapsed time) after the last abnormality diagnosis has exceeded a predetermined period (a predetermined time). Alternatively, the abnormality diagnosis may be performed only once every travel or every multiple travels.

If it is determined in S101 that the integrated travel distance TDsum after the last abnormality diagnosis has not exceeded the predetermined distance α, it is determined that the execution timing of the abnormality diagnosis is not reached and the routine is ended without performing subsequent processing.

If it is determined in S101 that the integrated travel distance TDsum after the last abnormality diagnosis has exceeded the predetermined distance a, it is determined that the execution timing of the abnormality diagnosis is reached and the process proceeds to S102. In S102, it is determined whether an intake air quantity sensor abnormality detection flag Fabn is set at 0 (Fabn=0) indicating that the abnormality has not been detected, i.e., indicating the normality. If the intake air quantity sensor abnormality detection flag Fabn is set at 1 (Fabn=1) indicating that the abnormality has been detected, the routine is ended without performing subsequent processing.

If it is determined in S102 that the intake air quantity sensor abnormality detection flag Fabn is set at 0 indicating that the abnormality has not been detected yet, abnormality diagnosis processing from S103 is performed as follows. First, in S103, engine operation parameters such as the engine rotation speed NE and the throttle opening degree THR are read as data used for determining whether the engine operation state is the steady operation state. In addition, either of the valve timing, the ignition timing, the fuel injection timing, the fuel injection quantity, the air-fuel ratio, the accelerator operation amount and the change gear ratio of the transmission may be read. In short, arbitrary engine operation parameters used for determining whether the engine operation state is the steady operation state may be read.

Then, the process proceeds to S104, in which it is determined whether the engine operation state is the steady operation state where the intake air quantity is maintained substantially constant based on the engine operation parameters such as the engine rotation speed NE and the throttle opening degree THR read in S103. If it is determined that the engine operation state is not the steady operation state but is a transient operation state where the intake air quantity fluctuates, the routine is ended without performing subsequent processing. The processing of S103 and S104 functions as a steady operation state determining section.

If it is determined in S104 that the engine operation state is the steady operation state, the process proceeds to S105. In S105, the present output of the intake air quantity sensor 14 is stored in the memory (not shown) of the ECU 30 and the engine operation parameters (the engine rotation speed NE, the throttle opening degree THR and the like) used for the determination of the steady operation state are stored in the memory of the ECU 30. After that, in S105, the power supply switch device 31 is temporarily switched off to temporarily power off the intake air quantity sensor 14.

Then, the process proceeds to S106, in which the process waits until the predetermined time T1 elapses after the intake air quantity sensor 14 is powered off. The predetermined time T1 is set at the time substantially equal to or slightly longer than the time since the intake air quantity sensor 14 is powered off until the state of the sensor element 14a of the intake air quantity sensor 14 substantially returns to the initial state (i.e., the state before the start).

When the predetermined time T1 elapses after the intake air quantity sensor 14 is powered off, the process proceeds to S107, in which the intake air quantity sensor 14 is powered on again by switching on the power supply switch device 31. Then, the process proceeds to S108, in which the engine operation parameters (the engine rotation speed NE, the throttle opening degree THR and the like) having been used for the determination of the steady operation state are read, and it is determined whether the engine operation state at the time immediately after the intake air quantity sensor 14 is powered on again is the same as the engine operation state immediately preceding the power-off. If both states are not the same (i.e., if the engine operation state has changed during the power-off period), the routine is ended without performing subsequent processing.

If it is determined in S108 that the engine operation state at the time immediately after the intake air quantity sensor 14 is powered on is the same as the engine operation state immediately preceding the power-off, the process proceeds to S109. In S109, the process waits until the predetermined time T2 elapses after the intake air quantity sensor 14 is powered on again. The predetermined time T2 is set at a time slightly longer than a design value (a specification value) of the response time of the intake air quantity sensor 14.

The process proceeds to S100 when the predetermined time T2 elapses after the intake air quantity sensor 14 is powered on again. In S100, the present output of the intake air quantity sensor 14 is read, and the present output of the intake air quantity sensor 14 is compared with a determination threshold value K. The determination threshold value K is equivalent to a certain ratio of the stored output value (the stored value stored in S105) of the intake air quantity sensor 14 immediately preceding the power-off (i.e., K=stored value of intake air quantity sensor output immediately preceding power-off×certain ratio).

The certain ratio may be an arbitrary ratio such as 50%, 63.2% or 70%, for example. The certain ratio is set such that the output at the time when the predetermined time T2 elapses after the intake air quantity sensor 14 is powered on again exceeds the determination threshold value K if the response characteristic of the intake air quantity sensor 14 is normal and such that the output at the time when the predetermined time T2 elapses after the intake air quantity sensor 14 is powered on again is smaller than the determination threshold value K if the response characteristic has deteriorated.

If it is determined in S110 that the present output of the intake air quantity sensor 14 is equal to or greater than the determination threshold value K, it is determined that the intake air quantity sensor 14 is normal, and the routine is ended as it is.

If it is determined in S110 that the present output of the intake air quantity sensor 14 is smaller than the determination threshold value K, it is determined that the intake air quantity sensor 14 is abnormal, and the process proceeds to S111. In S111, the intake air quantity sensor abnormality detection flag Fabn is set to 1 (Fabn=1) indicating that the abnormality has been detected. In following S112, a warning lamp provided in an instrument panel at a driver's seat is lit or an alarm is displayed in an alarm display section of the instrument panel to give a warning to the driver In addition, in S112, abnormality information (such as the intake air quantity sensor abnormality detection flag Fabn or an abnormality code) is stored in a rewritable nonvolatile memory such as a backup RAM of the ECU 30. Then, the routine is ended.

(Intake Air Quantity Sensing Routine)

An intake air quantity sensing routine of FIG. 5 is repeatedly executed in a predetermined cycle during the engine operation. If the routine is started, first in S121, it is determined whether the intake air quantity sensor abnormality detection flag Fabn is set at 0 (Fabn=0) indicating that the abnormality has not been detected, i.e., indicating the normality. If the intake air quantity sensor abnormality detection flag Fabn is 0 (Fabn=0), the process proceeds to S122, in which it is determined whether the present time is within the power-off period. If the present time is out of the power-off period, the process proceeds to S127, in which the present sensing value of the intake air quantity sensor 14 is used as sensed intake air quantity Mafm.

If it is determined in S122 that the present time is within the power-off period, the process proceeds to S126. In S126, the engine operation state (such as the fuel injection quantity and the throttle opening degree THR) is controlled using the stored value of the sensed intake air quantity immediately preceding the power-off as the sensed intake air quantity Mafm in the power-off period. This function plays a role of an operation controlling section.

If it is determined in S121 that the intake air quantity sensor abnormality detection flag Fabn is set at 1 indicating that the abnormality has been detected, the process proceeds to S123. In S123, the use of the intake air quantity sensor 14 is stopped, and a present output Pm of the intake pipe pressure sensor 19 is read. In next S124, estimated intake air quantity Mc is calculated from a map or the like based on the output Pm of the intake pipe pressure sensor 19 (i.e., the intake pipe pressure). Then, the process proceeds to S125, in which the engine operation state (such as the fuel injection quantity and the throttle opening degree THR) is controlled using the estimated intake air quantity Mc as the sensed intake air quantity Mafm. The processing of S123 to S125 functions as an abnormal time intake air quantity estimating section.

According to the above-described first embodiment, while there occurs the steady operation state where the engine operation state (such as the intake air quantity) is maintained substantially constant, the intake air quantity sensor 14 is temporarily powered off and is powered on again when the predetermined time T1 elapses thereafter. The output rising characteristic of the intake air quantity sensor 14 at the time when the intake air quantity sensor 14 is powered on again is sensed and the abnormality diagnosis of the intake air quantity sensor 14 is performed based on the sensing value of the output rising characteristic. Therefore, the output rising characteristic of the intake air quantity sensor 14 can be sensed with high accuracy during the engine operation. Also, the abnormality of the response characteristic deterioration of the intake air quantity sensor 14 can be detected with high accuracy based on the sensing value of the output rising characteristic. In this case, if a constant abnormality that the output of the intake air quantity sensor 14 constantly deviates from a normal range occurs, the output rising characteristic of the intake air quantity sensor 14 at the time when the intake air quantity sensor 14 is powered on again also deviates from a normal range because of the constant abnormality. Accordingly, the constant abnormality of the intake air quantity sensor 14 can be also detected with high accuracy based on the output rising characteristic of the intake air quantity sensor 14 at the time when the intake air quantity sensor 14 is powered on again.

If the present invention is applied to a conventional system mounted with an intake air quantity sensor (an airflow meter) with slow response, it is necessary to lengthen the power-off time T1. Moreover, the time since the intake air quantity sensor is powered on again until the output of the intake air quantity sensor converges to a steady-state value lengthens, so there is a possibility that the engine operation state changes and the intake air quantity fluctuates during the time. Even in such the case, by estimating the intake air quantity based on at least one of the intake pipe pressure, the throttle opening degree and the engine rotation speed during the power-off period or the period since the intake air quantity sensor is powered on again until the output of the intake air quantity sensor converges to the steady-state value, the engine operation control such as the fuel injection control according to the intake air quantity can be continued.

The first embodiment uses the high-response intake air quantity sensor 14, the output of which changes with high response in accordance with the change in the intake air quantity. Therefore, the power-off time T1 can be shortened, and the time since the intake air quantity sensor 14 is powered on again until the output of the intake air quantity sensor 14 converges to the steady-state value can be shortened. Thus, the engine operation state can be controlled using the sensing value (the stored value) of the intake air quantity sensor 14 immediately preceding the power-off. Accordingly, the present invention can be applied also to a system that does not have the intake pipe pressure sensor 19 and the like.

Second Embodiment

Figure 6:
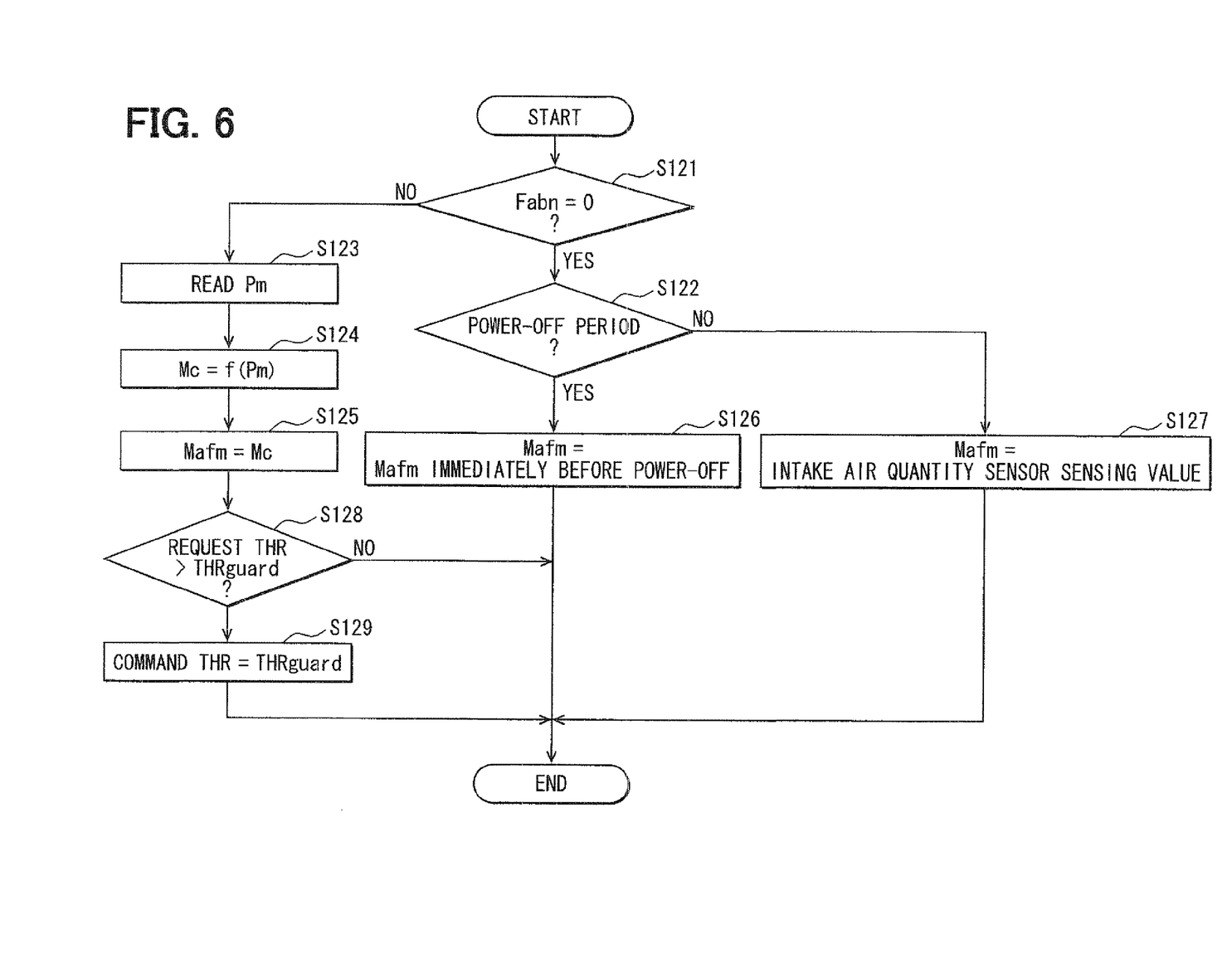
FIG. 6 is a flowchart showing a processing flow of an intake air quantity sensing routine according to a second embodiment of the present invention.

Next, a second embodiment of the present invention will be described. In the second embodiment, an intake air quantity sensing routine of FIG. 6 is executed. The intake air quantity sensing routine of FIG. 6 adds processing of S128 and S129 after S125 of the intake air quantity sensing routine of FIG. 5 according to the above-described first embodiment. The other construction is unchanged from the first embodiment.

In the intake air quantity sensing routine of FIG. 6, when the intake air quantity sensor abnormality detection flag Fabn is set at 1 (Fabn=1) indicating that the abnormality has been detected, the estimated intake air quantity Mc estimated based on the output Pm of the intake pipe pressure sensor 19 (i.e., the intake pipe pressure) is used as the sensed intake air quantity Mafm (in S123 to S125). In following S128, it is determined whether a request throttle opening degree THR (i.e., a requested throttle opening degree) is larger than an abnormal time guard value THRguard. If the request throttle opening degree THR is equal to or smaller than the abnormal time guard value THRguard, the routine is ended as it is. The abnormal time guard value THRguard is set in consideration of the throttle opening degree upper limit value, below which the driver can perform the operation relatively safely.

If it is determined in S128 that the request throttle opening degree THR is larger than the abnormal time guard value THRguard, the process proceeds to S129. In S129, guard processing of the request throttle opening degree THR is performed with the abnormal time guard value THRguard, and a command throttle opening degree THR (i.e., a commanded throttle opening degree) is set at the abnormal time guard value THRguard. Then, the routine is ended. The processing of S128 and S129 plays a role of an abnormal time throttle opening degree limiting section.

According to the above-described second embodiment, when the abnormality of the intake air quantity sensor 14 is detected, the command throttle opening degree THR is limited to or under the abnormal time guard value THRguard. Accordingly, when the abnormality occurs in the intake air quantity sensor 14, the engine power can be limited within the range where the driver can perform the operation relatively safely. Thus, the safety is improved.

Third Embodiment

Next, a third embodiment of the present invention will be described. In the third embodiment, the present invention is applied to a system having an ECU 30 mounted with functions of an air-fuel ratio feedback control section for performing feedback control for conforming the air-fuel ratio (or the fuel injection quantity) to the target air-fuel ratio based on the output of the exhaust gas sensor 24 during the engine operation, a learning correcting section for learning an air-fuel ratio correction value and correcting the air-fuel ratio with a learning value during the air-fuel ratio feedback control, and a learning value limiting section for limiting the learning value of the air-fuel ratio correction value with upper and lower limit guard values.

Figure 7:
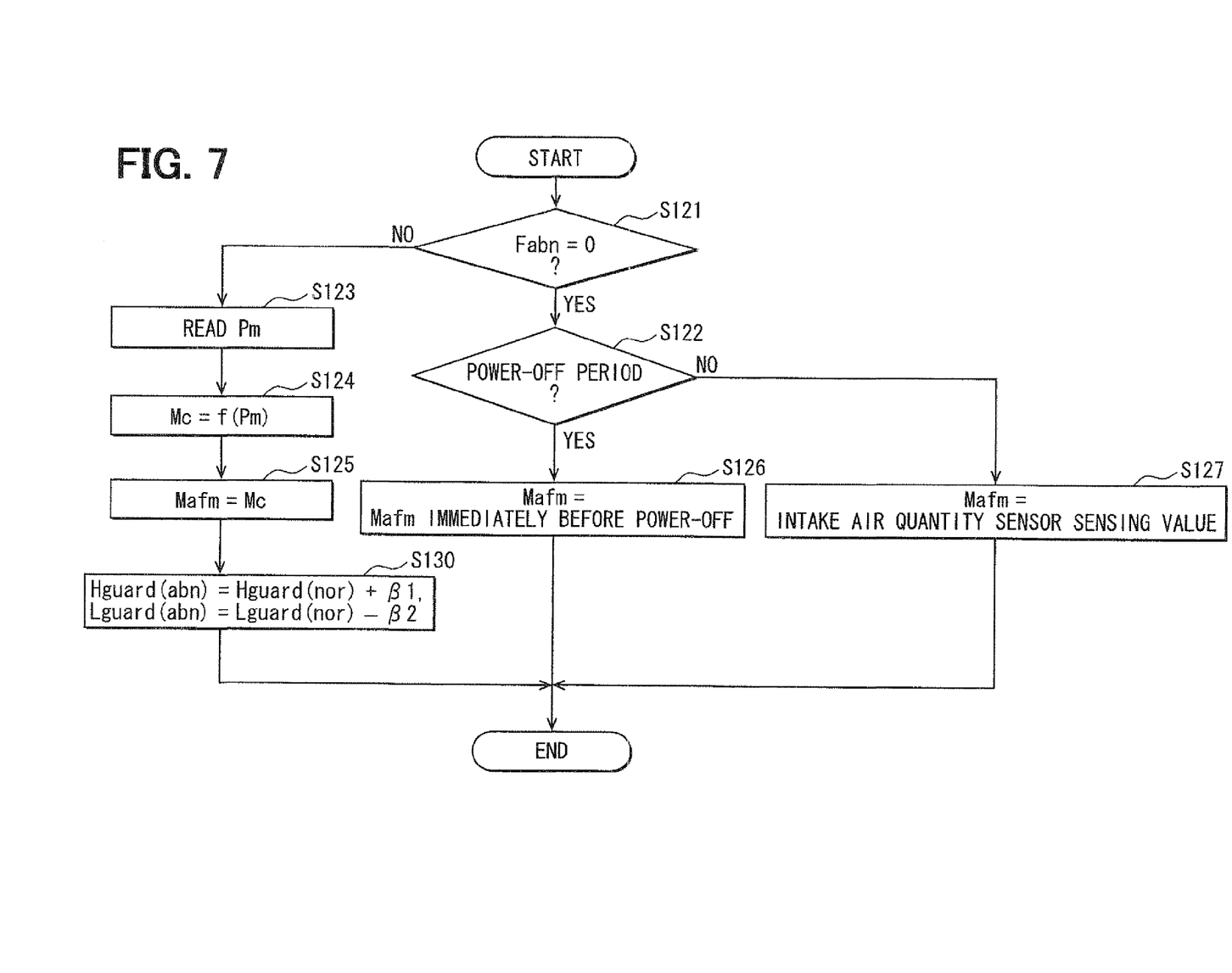
FIG. 7 is a flowchart showing a processing flow of an intake air quantity sensing routine according to a third embodiment of the present invention.

An intake air quantity sensing routine of FIG. 7 executed in the third embodiment adds processing of S130 after S125 of the intake air quantity sensing routine of FIG. 5 according to the first embodiment. The other processing is unchanged from the first embodiment.

In the intake air quantity sensing routine of FIG. 7, when the intake air quantity sensor abnormality detection flag Fabn is set at 1 indicating that the abnormality has been detected, the estimated intake air quantity Mc estimated based on the output Pm of the intake pipe pressure sensor 19 (i.e., the intake pipe pressure) is used as the sensed intake air quantity Mafm (in S123 to S125). Then, in following S130, a predetermined value β1 is added to the upper limit guard value Hguard of the air-fuel ratio correction value learning value, and a predetermined value β2 is subtracted from the lower limit guard value Lguard of the air-fuel ratio correction value learning value. Thus, the interval between the upper limit guard value Hguard(abn) and the lower limit guard value Uguard(abn) in the case where the intake air quantity sensor 14 is abnormal is widened from the interval between the upper limit guard value Hguard(nor) and the lower limit guard value Uguard(nor) in the case where the intake air quantity sensor 14 is normal. The processing of S130 functions as an abnormal time guard value enlarging section.

When the intake air quantity sensor 14 is abnormal, air-fuel ratio control accuracy deteriorates due to the deterioration of the sensing accuracy of the intake air quantity, so the deviation of the actual air-fuel ratio from the target air-fuel ratio enlarges. Therefore, by widening the interval between the upper and lower limit guard values Hguard, Lguard of the learning value of the air-fuel ratio correction value when the intake air quantity sensor 14 is abnormal as in the third embodiment, the learning value of the air-fuel ratio correction value at the time when the intake air quantity sensor 14 is abnormal can be set larger than in the usual case (i.e., the case where the intake air quantity sensor 14 is normal), and the air-fuel ratio (or the fuel injection quantity) can be corrected with the large learning value. Thus, the deviation of the actual air-fuel ratio from the target air-fuel ratio can be reduced by effectively using the learning correction function of the air-fuel ratio feedback control when the intake air quantity sensor 14 is abnormal.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An abnormality diagnosis device of an intake air quantity sensor for sensing an intake air quantity of an internal combustion engine, the abnormality diagnosis device comprising:
    an abnormality diagnosing means for performing abnormality diagnosis of the intake air quantity sensor;
    a power supply switching means for temporarily powering off the intake air quantity sensor and then powering on the intake air quantity sensor again during an operation of the internal combustion engine; and
    a steady operation determining means for determining whether an operation state of the internal combustion engine is a steady operation state, wherein
    the abnormality diagnosing means temporarily powers off the intake air quantity sensor and then powers on the intake air quantity sensor again with the power supply switching means in a period in which the steady operation determining means determines that the operation state of the internal combustion engine is the steady operation state, and
    the abnormality diagnosing means senses an output rising characteristic of the intake air quantity sensor at the time when the intake air quantity sensor is powered on again and performs the abnormality diagnosis of the intake air quantity sensor based on a sensing value of the output rising characteristic.

2. The abnormality diagnosis device as in claim 1, wherein the steady operation determining means determines whether the operation state of the internal combustion engine is the steady operation state based on one or a combination of two or more of rotation speed of the internal combustion engine, a throttle opening degree, valve timing, ignition timing, fuel injection timing, fuel injection quantity, an air-fuel ratio, an accelerator operation amount and a change gear ratio of a transmission.

3. The abnormality diagnosis device as in claim 1, wherein time since the power supply switching means temporarily powers off the intake air quantity sensor until the power supply switching means powers on the intake air quantity sensor again is set in accordance with time since the intake air quantity sensor is powered off until a state of a sensor element of the intake air quantity sensor substantially returns to an initial state.

4. The abnormality diagnosis device as in claim 1, further comprising:
    an operation controlling means for controlling an operation state of the internal combustion engine in a period, in which the power supply switching means powers off the intake air quantity sensor, by using a sensing value of the intake air quantity sensor immediately preceding the power-off.

5. The abnormality diagnosis device as in claim 1, further comprising,
    an abnormal time intake air quantity estimating means for prohibiting the sensing of the intake air quantity with the intake air quantity sensor and for estimating the intake air quantity based on at least one of intake pipe pressure, a throttle opening degree and rotation speed of the internal combustion engine when the abnormality diagnosing means detects the abnormality of the intake air quantity sensor.

6. The abnormality diagnosis device as in claim 1, further comprising:
    an abnormal time throttle opening degree limiting means for limiting a throttle opening degree to or under a predetermined opening degree when the abnormality diagnosing means detects the abnormality of the intake air quantity sensor.

7. The abnormality diagnosis device as in claim 1, further comprising:
    an air-fuel ratio feedback control means for performing feedback control of an air-fuel ratio to a target air-fuel ratio during the operation of the internal combustion engine;
    a learning correcting means for learning an air-fuel ratio correction value and for correcting the air-fuel ratio with the learning value during the feedback control of the air-fuel ratio;
    a learning value limiting means for limiting the learning value of the air-fuel ratio correction value with upper and lower limit guard values; and
    an abnormal time guard value enlarging means for enlarging an interval between the upper and lower limit guard values when the abnormality diagnosing means detects the abnormality of the intake air quantity sensor.

* * * * *